US012585921B2

(12) United States Patent
Shin

(10) Patent No.: US 12,585,921 B2
(45) Date of Patent: Mar. 24, 2026

(54) NODE SELECTION APPARATUS AND METHOD FOR MAXIMIZING INFLUENCE USING NODE METADATA IN NETWORK WITH UNKNOWN TOPOLOGY

(71) Applicant: INDUSTRY-ACADEMIC COOPERATION FOUNDATION, YONSEI UNIVERSITY, Seoul (KR)

(72) Inventor: Won Yong Shin, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 682 days.

(21) Appl. No.: 18/056,317

(22) Filed: Nov. 17, 2022

(65) Prior Publication Data

US 2023/0162009 A1 May 25, 2023

(30) Foreign Application Priority Data

Nov. 19, 2021 (KR) ........................ 10-2021-0160174

(51) Int. Cl.
*G06N 3/047* (2023.01)
*G06F 16/28* (2019.01)
*G06N 3/082* (2023.01)
*G06N 3/084* (2023.01)

(52) U.S. Cl.
CPC ........... *G06N 3/047* (2023.01); *G06F 16/288* (2019.01); *G06N 3/082* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 2011/0295626 A1* | 12/2011 | Chen ...................... | G06Q 30/02 706/54 |
| 2015/0120717 A1 | 4/2015 | Kim et al. | |
| 2018/0349961 A1* | 12/2018 | Vaswani ............ | G06Q 30/0254 |
| 2020/0226471 A1 | 7/2020 | Shanthamallu et al. | |
| 2021/0142424 A1* | 5/2021 | Dinh ...................... | G06Q 10/10 |

FOREIGN PATENT DOCUMENTS

| | | |
|---|---|---|
| JP | 2021-157395 A | 10/2021 |
| KR | 10-2020-0053318 A | 5/2020 |

OTHER PUBLICATIONS

Cong Tran et al., "A Study on Learning under Uncertainty: Analysis of Incomplete Networks", Doctoral Dissertation of Dankook University Graduate School, Jun. 3, 2021.
Cong Tran et al., "IM-META: Influence Maximization Using Node Metadata in Networks With Unknown Topology", arXiv:2106.02926v1 [cs.SI] Jun. 5, 2021.
Cong Tran et al., "Node Query-Aided Influence Maximization in Unobservable Networks", KICS Summer Conference 2021, Jun. 17, 2021.

* cited by examiner

*Primary Examiner* — Richard L Bowen

(57) ABSTRACT

A network node selection apparatus selects a seed node with the greatest influence by expanding the network connection structure by repeating, for a limited number of queries, the process of estimating an edge probability indicating the possibility of the existence of an edge between nodes based on the metadata of a plurality of nodes separately collected in a network where connection information between nodes through the edge is not provided, and expanding the network by selecting a query node according to the estimated edge probability, and selecting a seed node from the expanded network.

18 Claims, 6 Drawing Sheets

NODE SELECTION APPARATUS AND METHOD FOR MAXIMIZING INFLUENCE USING NODE METADATA IN NETWORK WITH UNKNOWN TOPOLOGY

CROSS-REFERENCE TO RELATED APPLICATIONS

This application claims priority under 35 U.S.C. § 119(a) to Korean Patent Application No. 10-2021-0160174, filed on Nov. 19, 2021, in the Korean Intellectual Property Office, the disclosure of which is incorporated herein in its entirety by reference.

BACKGROUND

1. Technical Field

The present disclosure relates to a network node selection apparatus and method, more particularly to a node selection apparatus and method for maximizing influence using node metadata in a network with unknown topology.

2. Description of the Related Art

Social networks play an important role in interpersonal relationships and interactions as a medium that facilitates the sharing of ideas, thoughts and information through virtual networks and community building. And now, social networks are used not only for information sharing between individuals, but also for information dissemination such as product promotion in various fields such as viral marketing, financial services, and medical services. When a social network is intended to be used for information dissemination, it is very efficient to disseminate through an opinion leader of the social network, that is, a node with the greatest influence among many nodes of the network.

Accordingly, a research on the influence maximization (IM) problem has been conducted, which aims to identify a set of seed nodes with a high influence among a plurality of nodes in a social network.

Existing research on the influence maximization problem has been conducted on the premise that the connection information between multiple nodes of a social network, that is, the topological structure, is fully recognized. However, in reality, in most cases, connection information of all nodes of a social network of a vast size cannot be acquired due to various constraints, and only very limited connection information can be acquired.

FIGS. 1A and 1B show an overall configuration of a social network and an actually obtainable configuration.

FIG. 1A shows an example of the overall configuration of a social network including all connection information between a plurality of nodes, and FIG. 1B shows an example of connection information collected under various constraints.

As shown in FIG. 1A, when a network configuration is obtained in which all edges, indicating whether the nodes are connected or not, are marked, it is easy to select a designated number of seed nodes that can maximize influence. In FIG. 1A, five seed nodes were selected and marked with red circles.

However, it is very difficult to obtain information about all nodes and all edges connecting nodes as in FIG. 1A in a social network of a vast scale. Basically, social networks do not provide information about edges if the user has set to private. And even when the user has set it to public, most social networks currently provide edge information in a very limited manner by default, and require a fee for additional edge information.

Therefore, in reality, only limited edge information can be obtained, and accordingly there is a difficulty that a seed node should be selected with only very limited edge information as shown in FIG. 1B.

In addition, the request for providing edge information is currently being performed in a way that transmits a query requesting information on the edge connected to an individual node. In the query transmission method, the network manager who has the connection structure information of the entire network returns a neighbor node directly connected through the edge to the node corresponding to the requested query. Accordingly, the query requester who has transmitted the query can expand the network connection information by adding the connection information ascertained using the query to the previously ascertained network connection information. In this case, a fee may be charged according to the number of times of query transmission.

Therefore, the selection of a query node to be checked using a query is also a very important issue. As an example, it is assumed that a first node among a plurality of nodes of the network is actually connected to 10 edges, while a second node is connected to only three edges. In this case, when the first node is selected as the query node, more network connection information can be obtained with only one query than when the second node is selected as the query node.

That is, maximizing influence in a network without connection information is a very important issue in selecting a query node as well as a seed node, but research on this has not been conducted until now.

STATEMENT REGARDING PRIOR DISCLOSURES BY THE INVENTOR OR A JOINT INVENTOR

At least one inventor or joint inventor of the present disclosure has made related disclosures in the research papers on Jun. 3, 2021, in IEEE research paper on Jun. 5, 2021, and in KICS Summer Conference on Jun. 17, 2021.

SUMMARY

An object of the present disclosure is to provide a network node selection apparatus and method that can select a seed node capable of maximizing influence in a network without connection information.

Another object of the present disclosure is to provide a network node selection apparatus and method that can select a node with the greatest influence in the network with a limited number of queries by estimating an edge probability that an edge exists between nodes based on the metadata of each node.

A node selection apparatus according to an embodiment of the present disclosure, conceived to achieve the objectives above, comprises: a data acquisition unit that collects metadata representing all collectible data for each of a plurality of nodes included in the network; a network expansion unit that obtains a final subgraph by repeating, for a predetermined limited number of times, a process of receiving a subgraph including metadata for the plurality of nodes and edges connecting between nodes previously ascertained through a query, creating virtual edges according to all connectable node combinations between nodes except for edges ascertained by the query and connecting nodes with the virtual edges, creating a virtual edge graph by weighting the corresponding virtual edge with an edge probability, which is the probability that an edge exists between nodes of the corresponding combination, obtained by computing the metadata of nodes according to each combination with an artificial neural network, selecting a query node to request a query to a network server from among the nodes of the subgraph based on the virtual edge graph and transmitting the query, and, when edge and node information connected to the selected query node are obtained in response to the transmitted query, combining the obtained edge and node information with the subgraph to obtain an expanded subgraph; and a seed selection unit that receives the final subgraph, analyzes an influence of each node in a predetermined way based on a connection relationship in which each of the nodes included in the final subgraph is connected to other nodes through edges, and selects a predetermined number of nodes with high influence as seed nodes.

The network expansion unit may include: a virtual edge generation unit that receives a pre-obtained initial subgraph or a pre-obtained subgraph and metadata for each of the plurality of nodes from the network server, connects the virtual edge between a pair of nodes of all possible combinations in the remaining nodes except for edges connected to the nodes ascertained by the previous query, and generates the virtual edge graph by inferring the edge probability by neural network operation on the metadata and weighting a corresponding virtual edge; an edge pruning unit that obtains an edge pruning graph by removing virtual edges whose edge probability is less than a predetermined reference probability from the virtual edge graph; a diffusion probability calculation unit that calculates a diffusion probability, which represents a probability that each node will propagate information to other nodes, based on the edge probabilities of edges and virtual edges connected to a plurality of nodes of the edge pruning graph, and obtains a weighted edge graph by weighting the edges and virtual edges with the calculated diffusion probability as an additional weight; a query node selection unit that, when the number of query transmissions is less than or equal to the limited number, selects a query node for expanding a subgraph from among nodes not selected as a previous query node in a current subgraph based on the weighted edge graph; and a subgraph expansion unit that transmits a query to the network server according to the selected query node, receives a response to the query, and expands the current subgraph by combining edge and node information included in the received response to the current subgraph.

The virtual edge generation unit may include: a vector acquisition unit that receives two metadata corresponding to each of a pair of nodes according to each combination, and obtains two embedding vectors by performing a neural network operation on the two metadata using an artificial neural network, respectively; an edge probability acquisition unit that calculates the edge probability by calculating the relationship between the two embedding vectors in a predetermined way; and a virtual edge graph generation unit that connects each of a pair of nodes according to all combinations with the virtual edge, and generates the virtual edge graph by weighting it with the edge probability corresponding to each of the virtual edges as a weight.

The diffusion probability calculation unit may weight each edge with a diffusion probability using either an independent cascade (IC) model, which is a diffusion model that sets the same diffusion probability for all nodes to propagate information to other nodes connected by edges, or a weighted cascade (WC) model that sets the diffusion probability of each edge differently according to the number of edges connected to each node and the edge probability weighted to each edge connected.

When the number of query transmissions is less than or equal to the limited number, the query node selection unit may select the query node among query candidate nodes of the current subgraph that are not selected as the previous query node, considering a residual $$\left( r_u^{(t)} = \hat{d}_u^{(t)} - d_u^{(t)} \right)$$

obtained by subtracting the order ($d_u^{(t)}$), which is the number of edges ascertained by the query, from the predicted order $$(\hat{d}_u^{(t)})$$

of the node in which the weighted edge probability of each edge is reflected in the number of edges connected to each node in the weighted edge graph, and the minimum number of paths ($GD^{(t)}(u, v)$) to nodes with large influence detected according to the pre-designated influence maximization algorithm among nodes not included in the subgraph in the weighted edge graph.

The query node selection unit may be configured, when the number of query transmissions exceeds the limited number, to transmit the final subgraph last expanded by the subgraph expansion unit to the seed selection unit without selecting a query node.

A network node selection method according to another embodiment of the present disclosure, conceived to achieve the objectives above, comprises the steps of: collecting metadata representing all collectible data for each of a plurality of nodes included in the network; obtaining a final subgraph by repeating, for a predetermined limited number of times, a process of receiving a subgraph including metadata for the plurality of nodes and edges connecting between nodes previously ascertained through a query, creating virtual edges according to all node combinations that can be connected between nodes except for edges ascertained by query and connecting nodes with the virtual edges, creating a virtual edge graph by weighting the corresponding virtual edge with an edge probability, which is a probability that an edge exists between nodes of the corresponding combination, obtained by performing a neural network operation on the metadata of nodes according to each combination using an artificial neural network, selecting a query node to request a query to a network server from among nodes of the subgraph based on the virtual edge graph and transmitting the query, and, when edge and node information connected to the selected query node are obtained in response to the transmitted query, and combining the obtained edge and node information with the subgraph to obtain an expanded subgraph; and receiving the final subgraph, analyzing an influence of each node in a predetermined way based on a connection relationship in which each of the nodes included in the final subgraph is connected to other nodes through edges, and selecting a predetermined number of nodes with high influence as seed nodes.

Accordingly, the network node selection apparatus and method according to an embodiment of the present disclosure can easily select a seed node with the greatest influence under conditions limited by cost or the like, by expanding the network connection structure as efficiently as possible by repeating, for a limited number of queries, the process of estimating an edge probability indicating the possibility of the existence of an edge between nodes based on the metadata of a plurality of nodes separately collected in a network where connection information between nodes through the edge is not provided, and expanding the network by selecting a query node according to the estimated edge probability, and selecting a seed node from the expanded network.

DETAILED DESCRIPTION

Figure 1A:
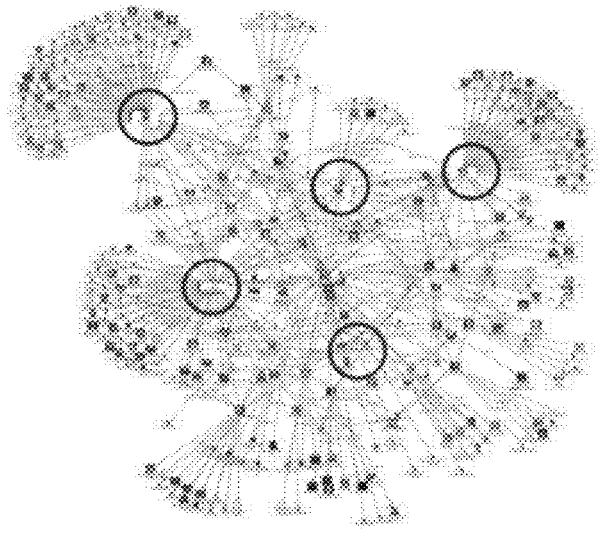
FIGS. 1A and 1B show an overall configuration of a social network and an actually obtainable configuration.
Figure 1B:
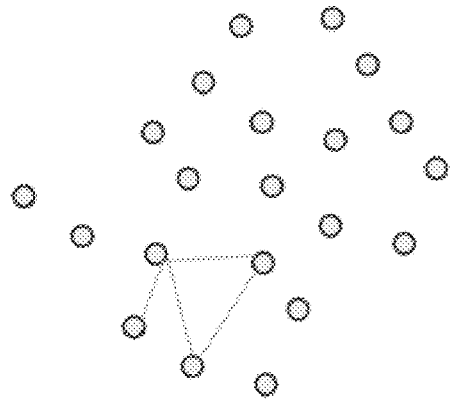

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
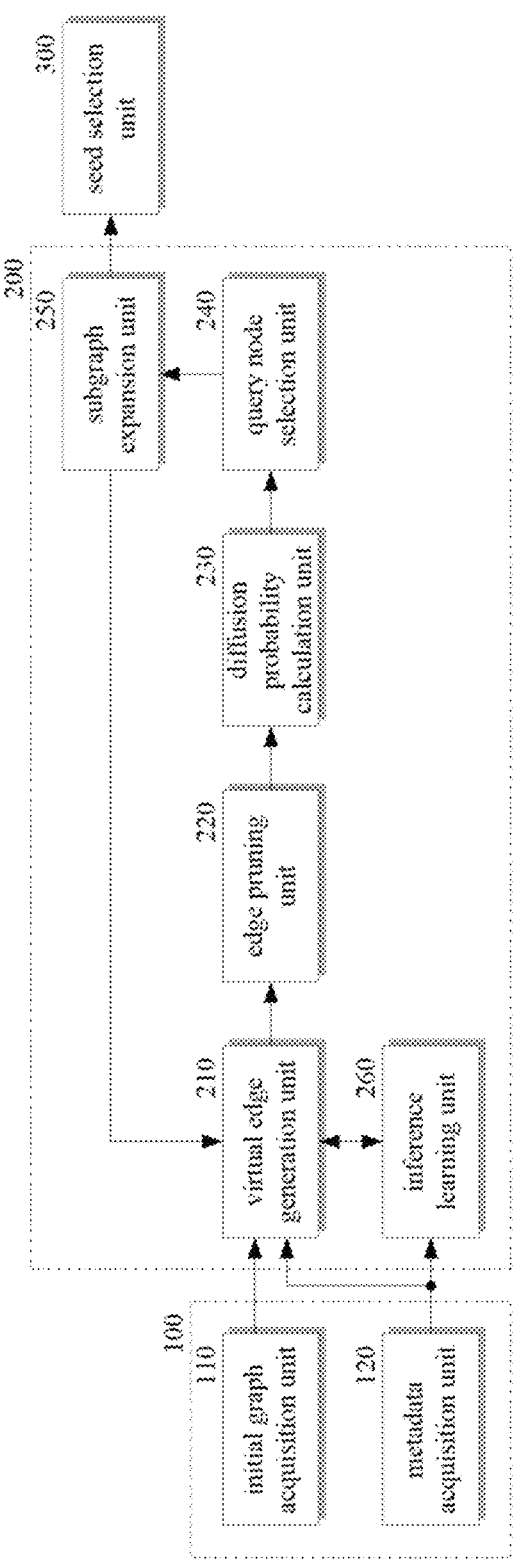
FIG. 2 shows a schematic structure of a network node selection apparatus according to an embodiment of the present disclosure.
Figure 3:
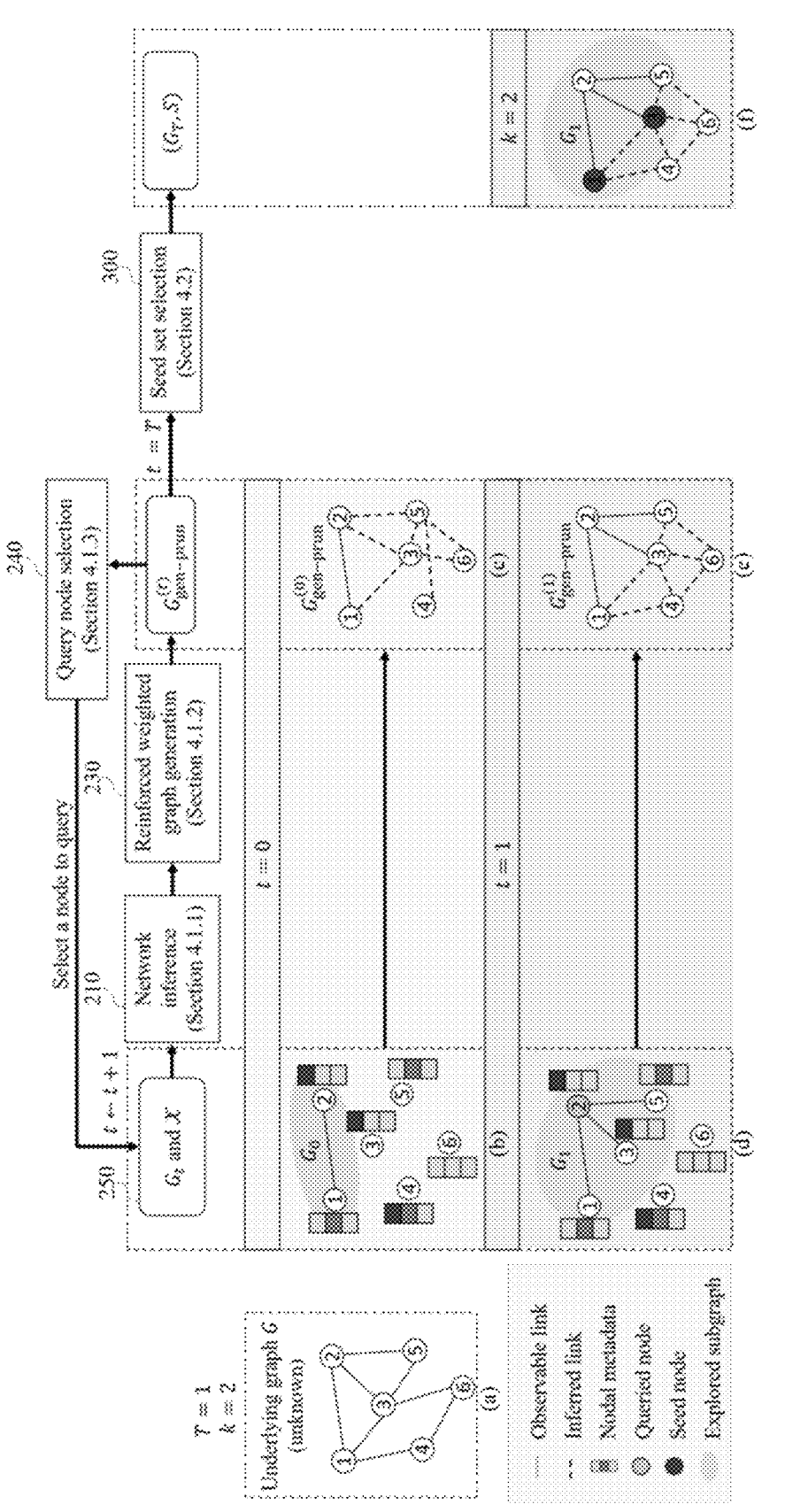
FIG. 3 is a diagram for explaining an operation of the network node selection apparatus of FIG. 2.

FIG. 2 shows a schematic structure of a network node selection apparatus according to an embodiment of the present disclosure, and FIG. 3 is a diagram for explaining an operation of the network node selection apparatus of FIG. 2.

Referring to FIG. 2, the network node selection apparatus according to the present embodiment may include a data acquisition unit 100, a network expansion unit 200 and a seed selection unit 300.

The data acquisition unit 100 collects and acquires initially collectible data without transmission of a separate query for an underlying network graph (G=(V, E)) consisting of a node set (V=$\{v_1, \ldots, v_n\}$) including a plurality of nodes and an edge set (E) including a plurality of edges connecting a plurality of nodes.

The data acquisition unit 100 may include an initial graph acquisition unit 110 for acquiring an initial subgraph ($G_0$) including some nodes among a plurality of nodes and at least one edge, and a metadata acquisition unit 120 for acquiring a metadata set (X=$\{x_1, \ldots, x_n\}$) including metadata for each of a plurality of nodes.

The initial graph acquisition unit 110 acquires the initial subgraph ($G_0$) through information on the nodes and at least one edge that are basically provided without a separate query transmission in the underlying network graph (G). As described above, most social networks currently impose restrictions on information provision, but very limited basic information including information on some nodes among a plurality of nodes of the node set (V) and at least one edge connected between some nodes is often provided. Accordingly, the initial graph acquisition unit 110 may generate the initial subgraph ($G_0$) as shown in (b) of FIG. 3 by using information on the nodes and at least one edge that are basically provided in the underlying network graph (G) consisting of 6 nodes ($v_1$~$v_6$) marked with ①~⑥ as shown in (a) of FIG. 3. In (b) of FIG. 3, the initial subgraph ($G_0$) represents an elliptical region composed of only the first and second nodes ($v_1$, $v_2$) and one edge connecting the first and second nodes ($v_1$, $v_2$). In addition, since, for the third to sixth nodes ($v_3$~$v_6$) located outside the elliptical region, the connection configuration through edges does not appear, the existence of nodes is only ascertained through metadata, etc., which will be described later, and the third to sixth nodes ($v_3$~$v_6$) are not included in the initial subgraph ($G_0$). And in some cases, basic information may not be provided, and in this case, the initial graph acquisition unit 110 may be omitted.

Meanwhile, the metadata acquisition unit 120 may acquire may acquire metadata corresponding to each node by collecting information on each of a plurality of nodes of the node set (V). Here, the metadata for each node is a characteristic of each node, and may be obtained based on separately collected data as well as publicly provided data on the network. For example, when each node in the network means a user, metadata can also be generated by collecting various personal information set to be public by the user or information on content created or used by the user. This is to check the possibility that two nodes can be connected with an edge by checking nodes for other users who are presumed to be related based on the personal information set to be public by the user or the contents used, etc. In this embodiment, it is assumed that the metadata is obtained in the form of a vector having a predetermined size. In FIG. 3, the metadata is displayed in the form of a bar on the left side of each of the six nodes ($v_1$~$v_6$) in (b) and (d).

The network expansion unit 200 repeats a process of estimating the edge probability ($\theta^{(t)}$) indicating the possibility that each edge exists between nodes based on the acquired subgraph ($G_t$) and metadata about the node acquired in the data acquisition unit 100, and, selecting a query node with a high probability of expanding the subgraph ($G_t$) from among the nodes in the subgraph ($G_t$) based on the estimated edge probability ($\theta^{(t)}$) and transmitting a query, thereby acquiring an expanded subgraph ($G_{t+1}$).

The network expansion unit 200 may include a virtual edge generation unit 210, an edge pruning unit 220, a diffusion probability calculation unit 230, a query node selection unit 240, a subgraph expansion unit 250 and an inference learning unit 260.

The virtual edge generation unit 210 receives an initial subgraph ($G_0$) obtained in the initial graph acquisition unit 110 or a subgraph ($G_t$) expanded and created in the previous subgraph expansion unit 250 and metadata for each of a plurality of nodes collected in the metadata acquisition unit 120, and infers, based on the metadata, the edge probability ($\theta^{(t)}$) indicating a possibility that an edge exists between the remaining nodes except for edges connected to nodes already ascertained by the query in the obtained subgraph ($G_t$). Then, a virtual edge graph $$\left( G_{gen}^{(t)} \right)$$

is obtained by creating virtual edges which are weighted with the inferred edge probability ($\theta^{(t)}$) as a weight and connecting a plurality of nodes. That is, the virtual edge generation unit 210 connects a plurality of nodes, whose connection relationship with other nodes is not ascertained, to each other with virtual edges, infers the edge probability ($\theta^{(t)}$) for the connected virtual edges and assigns it as a weight, thereby creating the virtual edge graph $$\left( G_{gen}^{(t)} \right).$$

In this embodiment, the virtual edge generation unit 210 is configured to include an artificial neural network that performs a neural network operation according to the trained method, and estimates each edge probability ($\theta^{(t)}$) between a plurality of nodes based on the applied metadata for the plurality of nodes.

At this time, the virtual edge generation unit 210 is trained based on the presence or absence of an edge ascertained between nodes of a sub-node set ($V_t$), that is a set of nodes included in the currently acquired subgraph ($G_t$), thereby estimating the edge probability ($\theta^{(t)}$) for the presence or absence of unascertained edges in all nodes. Specifically, the virtual edge generation unit 210 may learn the correlation between the metadata of the nodes currently ascertained to be connected to the edge, thereby obtaining) the edge probability $$\left( \theta_{uv}^{(t)} \right)$$

according to the correlation between metadata of nodes whose edges are not ascertained.

Figure 4:
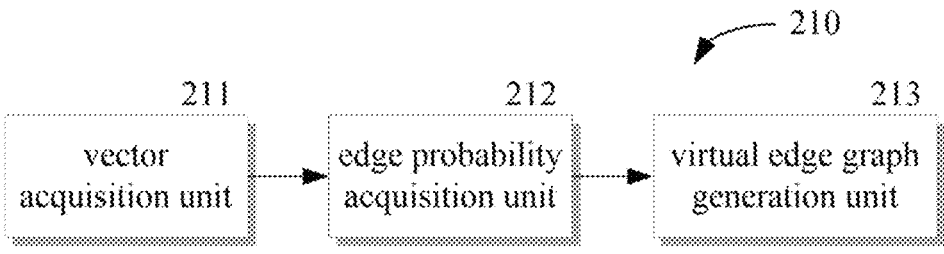
FIG. 4 shows an example of a detailed configuration of the virtual edge generation unit of FIG. 2.
Figure 5:
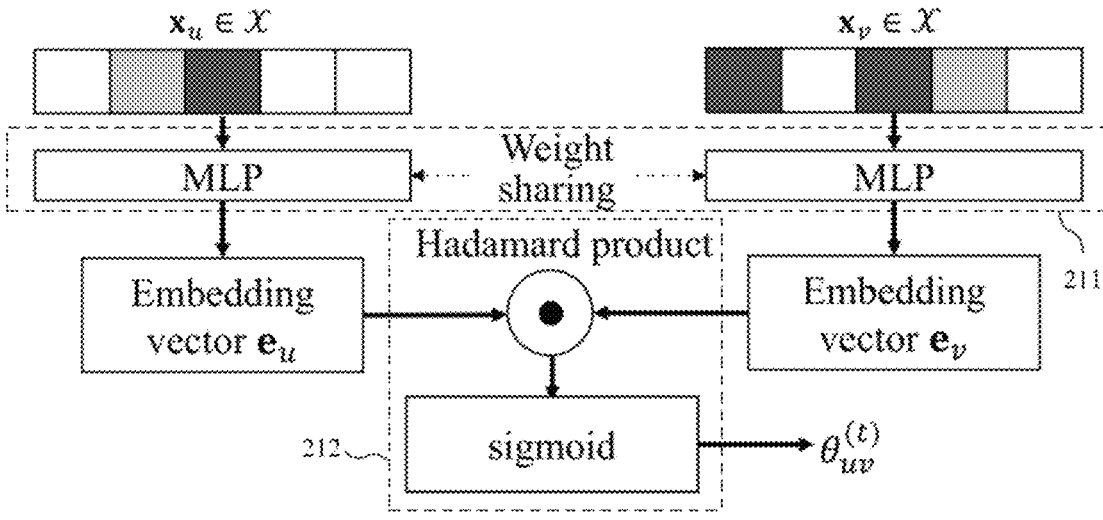
FIG. 5 shows an implementation example of the vector acquisition unit and the edge probability acquisition unit in FIG. 4.

FIG. 4 shows an example of a detailed configuration of the virtual edge generation unit of FIG. 2, and FIG. 5 shows an implementation example of the vector acquisition unit and the edge probability acquisition unit in FIG. 4.

Referring to FIG. 4 and FIG. 5, the virtual edge generation unit 210 may include a vector acquisition unit 211, an edge probability acquisition unit 212 and a virtual edge graph generation unit 213.

The vector acquisition unit 211 may extract embedding vectors ($e_u$, $e_v$) corresponding to each metadata by receiving metadata ($x_u$, $x_v$) for two different nodes (u, v) and performing a neural network operation according to the neural network weight (W) obtained by learning. The edge probability acquisition unit 212 obtains the edge probability $$\left( \theta_{uv}^{(t)} \right)$$

from the extracted two embedding vectors ($e_u$, $e_v$), and the virtual edge graph generation unit 213 generates a virtual edge graph $$\left( G_{gen}^{(t)} \right)$$

by connecting nodes, for which the existence of an edge is not ascertained, with virtual edges having the edge probability ($\theta^{(t)}$).

Specifically, the vector acquisition unit 211 receives metadata ($x_u$, $x_v$) for two different nodes (u, v) in all possible combinations for the remaining nodes except for nodes for which the presence or absence of an edge is ascertained using a query, among a plurality of nodes of the node set (V), and performs a neural network operation according to the trained method, thereby obtaining two embedding vectors ($e_u$, $e_v$) corresponding to the metadata ($x_u$, $x_v$). That is, the vector acquisition unit 211 obtains the embedding vectors ($e_u$, $e_v$) for a pair of nodes (u, v) in all possible combinations in the remaining nodes except for a query node set ($Q_t \subseteq V_t$) selected as the previous query node.

As shown in FIG. 5, the vector acquisition unit 211 is composed of two multilayer perceptrons (MLPs) having the same structure, and can be implemented as a Siamese neural network having the same neural network weight (W) obtained by learning. The first MLP of the two MLPs receives metadata ($x_u$) for one node (u) among a pair of nodes (u, v) obtained in various combinations and performs a neural network operation according to the neural network weight (W), thereby extracting the embedding vector ($e_u$) corresponding to the node (u), and the second MLP receives the metadata ($x_v$) for the node (v) and performs a neural network operation, thereby extracting the embedding vector ($e_v$) corresponding to the node (v).

In addition, the edge probability acquisition unit 212 performs a Hadamard product with the two embedding vectors ($e_u$, $e_v$) obtained in the vector acquisition unit 211, and normalizes to a value in a predetermined range (here, [0, 1] as an example) with a predetermined activation function (here, for example, a sigmoid function), thereby obtaining the edge probability $$\left( \theta_{uv}^{(t)} \in [0, 1] \right)$$

between the two nodes (u, v).

That is, the vector acquisition unit 211 obtains the embedding vector ($e_u$, $e_v$) by encoding the metadata ($x_u$, $x_v$) of each of the two nodes (u, v) according to the trained method, and the edge probability acquisition unit 212 obtains the edge probability $$\left( \theta_{uv}^{(t)} \right)$$

by inferring the correlation between the two metadata by the Hadamard product of the two embedding vectors ($e_u$, $e_v$). At this time, the edge probability $$\left(\theta_{uv}^{(t)}\right)$$

is obtained by being normalized to a value in the range [0, 1] by the sigmoid function, which is an activation function.

The virtual edge graph generation unit 213 connects between a pair of nodes (u, v) corresponding to the obtained edge probability $$\left(\theta_{uv}^{(t)}\right)$$

with a virtual edge, and assigns the obtained edge probability ($\theta^{(t)}$) to the connected virtual edge as a weight. Since the edge probability $$\left(\theta_{uv}^{(t)}\right)$$

is obtained in all combinations of the remaining nodes except for the query node set ($Q_t \subseteq V_t$), the virtual edges are connected according to each combination and weighted with the edge probability ($\theta^{(t)}$), so that the virtual edge graph $$\left(G_{gen}^{(t)}\right)$$

is created.

If it is ascertained through a query that an edge between two nodes (u, v) is included and already exists in an edge set ($E_t$), the virtual edge graph generation unit 213 sets the edge weight ($a_{uv}$) of the corresponding edge to 1. However, if it is ascertained through a query that the edge is not included in the edge set ($E_t$), that is, if it is ascertained through a query that at least one of the two nodes (u, v) is included in the query node set ($Q_t$), but there is no edge between the two nodes (u, v), it sets the edge weight ($a_{uv}$) of the corresponding edge to 0. And if the presence or absence of an edge is not ascertained because a query for the corresponding node is not transmitted, the edge weight ($a_{uv}$) of the corresponding edge is set to the edge probability ($\theta^{(t)}$). Therefore, the virtual edge graph generation unit 213 may generate a virtual edge graph $$\left(G_{gen}^{(t)}\right)$$

in which nodes are connected with edges having the edge weight ($a_{uv}$) according to Equation 1.

$$a_{uv} = \begin{cases} 1, & \text{if } (u, v) \in \varepsilon_t \\ 0, & \text{if } (u, v) \notin \varepsilon_t \text{ and } u, v \in Q_t \\ \theta_{uv}^{(t)}, & \text{otherwise} \end{cases} \qquad \text{[Equation 1]}$$

Meanwhile, since the virtual edge generation unit 210 includes a vector acquisition unit 211 composed of two MLPs, the vector acquisition unit 211 must be trained in advance to set the neural network weight (W), before obtaining the edge probability $$\left(\theta_{uv}^{(t)}\right).$$

Accordingly, in the present embodiment, the network expansion unit 200 includes an inference learning unit 260 for training the virtual edge generation unit 210.

Generally, the learning unit for training the artificial neural network is used in the learning stage before actually operating the artificial neural network, and then removed. However, in the present embodiment, the metadata and structure of the underlying network graph (G) itself are very different depending on the field used, and the underlying network graph (G) cannot be obtained in advance. Therefore, there is a problem in that it is difficult to normally train the vector acquisition unit 211 of the virtual edge generation unit 210 in advance.

In order to overcome this problem, in the present embodiment, the inference learning unit 260 may be configured together so that the vector acquisition unit 211 of the virtual edge generation unit 210 can be also trained in real time according to the subgraph ($G_t$) that is expanded through repeated queries and the neural network weight (W) can be updated accordingly.

The inference learning unit 260 provided to train the vector acquisition unit 211 calculates a similarity ($D_W(u,v)$) between embedding vectors ($e_u$, $e_v$) for nodes (u, v) of a subgraph ($G_t$) for which the presence or absence of an edge is ascertained through a query, that is, two nodes (u, v) in which at least one is included in the query node set ($Q_t$), according to Equation 2.

$$D_W(u,v) = \cos(e_u, e_v) \qquad \text{[Equation 2]}$$

And when the similarity ($D_W(u,v)$) is calculated, it calculates a loss (L) according to Equation 3 and backpropagates it, thereby updating the neural network weight (W) of the vector acquisition unit 211 implemented as a Siamese neural network.

$$\mathcal{L}(W, x_u, x_v) = \qquad \text{[Equation 3]}$$
$$(1 - a_{uv})\frac{1}{2}(D_w(u, v))^2 + a_{uv}\frac{1}{2}\{\max(0, r - D_w(u, v))\}^2$$

wherein, r represents a margin having a predetermined value (for example, 0.7) in the range (0 to 1).

That is, in the present embodiment, the inference learning unit 260 trains the vector acquisition unit 211 by calculating the loss (L) according to the presence or absence of an edge between the previously checked nodes and updating the neural network weight (W) accordingly. Therefore, when the subgraph ($G_t$) is expanded through a query, more ground truth can be obtained, and the vector acquisition unit 211 can be more accurately trained based on the obtained ground truth. Accordingly, the inference learning unit 260 repeatedly trains the vector acquisition unit 211 whenever the subgraph ($G_t$) is expanded, and it can be repeated up to a predetermined number of times for each acquired subgraph ($G_t$), or until the loss (L) is below a predetermined threshold value.

The edge pruning unit 220 obtains an edge pruning graph $$\left(G^{(t)}_{gen-prun}\right)$$

by removing virtual edges having an edge probability ($\theta^{(t)}$) less than a predetermined reference probability ($\varepsilon$) among a plurality of virtual edges of the virtual edge graph $$\left(G^{(t)}_{gen}\right).$$

As described above, the edge probability ($\theta^{(t)}$) weighted to the virtual edge represents the possibility of the existence of the corresponding edge, and the edge probability ($\theta^{(t)}$) is a value estimated based on metadata of a plurality of nodes. And in real networks, the existence of edges between nodes is generally rare. Therefore, a virtual edge having a low edge probability ($\theta^{(t)}$) is an edge that is unlikely to exist in reality, and has very low reliability. Such low-reliability virtual edges not only may reduce computational efficiency, but may also be accumulated as noise, which may cause an inefficient query node to be selected when a subsequent query node is selected.

To avoid these problems, the edge pruning unit 220 obtains an edge pruning graph $$\left(G^{(t)}_{gen-prun}\right)$$

by removing low-reliability virtual edges having an edge probability ($\theta^{(t)}$) less than a reference probability ($\varepsilon$) and accordingly simplifying the virtual edge graph $$\left(G^{(t)}_{gen}\right).$$

That is, only virtual edges having an edge probability ($\theta^{(t)}$) equal to or greater than a reference probability ($\varepsilon$) among the generated virtual edges are maintained, and the remaining virtual edges are removed. The reference probability ($\varepsilon$) may be set to 0.5, for example.

Here, the edge pruning unit 220 is separately illustrated for convenience of explanation, but the edge pruning unit 220 may be configured to be included in the virtual edge generation unit 210. Also, in some cases, the virtual edge graph generation unit 213 may be configured to generate virtual edges only when the edge probability ($\theta^{(t)}$) is equal to or greater than the reference probability ($\varepsilon$) to obtain the virtual edge graph $$\left(G^{(t)}_{gen}\right).$$

Meanwhile, the diffusion probability calculation unit 230 additionally weights the edge probability ($\theta^{(t)}$) assigned to a plurality of edges of the edge pruning graph $$\left(G^{(t)}_{gen-prun}\right)$$

with a diffusion weight according to the information diffusion capability of each node, thereby obtaining a weighted edge graph ($G_w^{(t)}$) in which a weighted edge probability is applied to each edge.

In a social network, an edge indicating whether an information transmission path is formed between a plurality of users and a diffusion power indicating whether each user will propagate information to other users may be different from each other. In particular, some users may only receive information propagated by other users, and may not propagate the received information to other users connected with edges again. Therefore, the existence of an edge between nodes in the network and the diffusion probability, which indicates the diffusion possibility of a node propagating information through an edge, can be separately distinguished. Accordingly, the actual information diffusion power through edges between nodes can be expressed as a weighted edge probability calculated as the product of the edge probability ($\theta^{(t)}$) and the diffusion probability.

In the present embodiment, the diffusion probability calculation unit 230 may calculate the diffusion probability of each node according to an independent cascade (IC) model or a weighted cascade (WC) model, which are known diffusion models.

Figure 6:
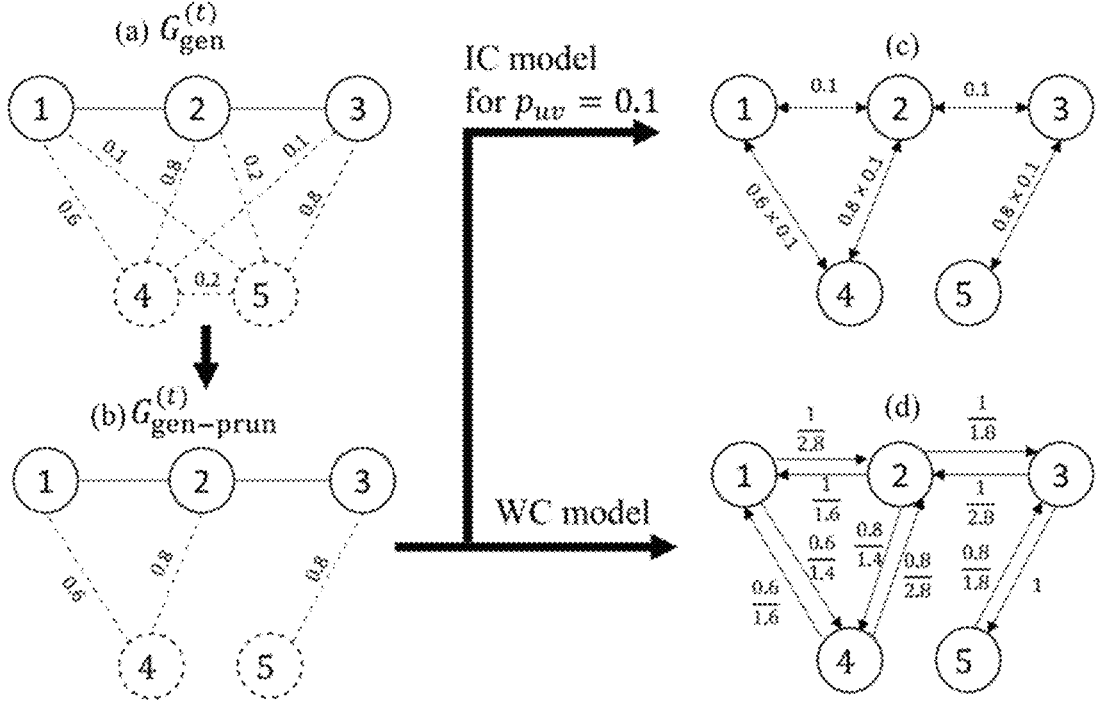
FIG. 6 is a diagram for explaining a detailed operation of the diffusion probability calculation unit of FIG. 2.

FIG. 6 is a diagram for explaining a detailed operation of the diffusion probability calculation unit of FIG. 2, and in FIG. 6, ① to ⑤ indicate first to fifth nodes ($v_1$ to $v_5$), respectively.

In FIG. 6, (a) shows a virtual edge graph $$\left(G^{(t)}_{gen}\right)$$

in which a plurality of nodes are connected with a virtual edge weighted with edge probability ($\theta^{(t)}$). In (a), a solid line indicates an edge that has been previously ascertained using a query, a dotted line indicates a virtual edge, and values displayed with virtual edges indicate edge probabilities ($\theta^{(t)}$). Since the edge probability ($\theta^{(t)}$) of the ascertained edge indicated by solid line is 1, it is not separately indicated. And in FIG. 6, (b) shows an edge pruning graph $$\left(G^{(t)}_{gen-prun}\right)$$

in which low-reliability virtual edges having an edge probability ($\theta^{(t)}$) less than the reference probability ($\varepsilon=0.5$) are removed from among the virtual edges of the virtual edge graph $$\left(G^{(t)}_{gen}\right).$$

And (c) and (d) show weighted edge graphs ($G_w^{(t)}$) in which the edges having the edge probability ($\theta^{(t)}$) are additionally weighted with the diffusion probability calculated according to the IC model and the WC model, respectively, and weighted edge probabilities indicating information diffusion power are indicated at each edge.

When an event that each node (u) propagates information to a node (v) connected with an edge in the diffusion process and activates is called $A_{uv}$, the diffusion probability ($p_{uv}$) at which the event ($A_{uv}$) in which the node (u) activates the node (v) occurs may be referred to as a conditional probability ($\Pr(A_{uv}|E_{uv})$) for the edge. Accordingly, the weighted edge probability ($\Pr(E_{uv}A_{uv})$) at each edge may be calculated as the product ($\theta^{(t)}p_{uv}$) of the edge probability ($\theta^{(t)}$) and the diffusion probability ($p_{uv}$).

In the case of the IC model shown in (c), it is considered that diffusion probabilities ($p_{uv}$) of all nodes are uniform (here, 0.1 as an example). In the IC model, since a diffusion probability ($p_{uv}$) of an edge connected between two nodes (u, v) is applied uniformly, the weighted edge probability ($\Pr(E_{uv}A_{uv})$) of the edge between the two nodes (u, v) is the same in both directions. That is, since information diffusion power from the node (u) to the node (v) and information diffusion power from the node (v) to the node (u) are identical, the directionality of the edge is not separately indicated in (c).

Looking at (c), the edge ($E_{12}$) between the first and second nodes ($v_1$, $v_2$) and the edge ($E_{23}$) between the second and third nodes ($v_2$, $v_3$) are edges all ascertained by a query, and their edge probabilities ($\theta^{(t)}$) are 1 ($\theta^{(t)}=1$), and the rest are virtual edges. The edge probability ($\theta^{(t)}$) for the virtual edge ($E_{14}$) between the first and fourth nodes ($v_1$, $v_4$) among the virtual edges is 0.6, and the edge probabilities for the rest are 0.8. And since the diffusion probability ($p_{uv}$) of all edges are uniform as 0.1, the weighted edge probability ($\Pr(E_{uv}A_{uv})$) of the edge ($E_{12}$) between the first and second nodes ($v_1$, $v_2$) is 1×0.1=1, and the weighted edge probability ($\Pr(E_{uv}A_{uv})$) of the edge ($E_{14}$) between the first and fourth nodes ($v_1$, $v_4$) is obtained as 0.6×0.1=0.06.

On the other hand, when the WC model shown in (d) is applied, the diffusion probability ($\Pr(A_{uv}|E_{uv})$) of each edge is calculated differently according to the order of each node (the number of edges connected to the node) and edge probability ($\theta^{(t)}$) in the edge pruning graph $$\left(G_{gen-prun}^{(t)}\right).$$

The edge probability ($\theta^{(t)}$) between two nodes (u, v) among a plurality of nodes may be equally designated irrespective of the direction to each node (u, v). However, since the diffusion probability ($p(A_{uv})$) may be different for each node, when the diffusion probability ($p(A_{uv})$) according to the WC model is considered, at the edge connecting the two nodes (u, v), there must be directionality considering the diffusion probability ($p(A_{uv})$). That is, an edge indicating information propagation in the direction (u->v) from one node (u) among two nodes (u, v) to the other node (v) and an edge indicating information propagation in a reverse direction (v->u) should be distinguished. Accordingly, unlike (c), in which each edge is displayed in both directions, in (d), each edge is displayed in one direction, and the diffusion probability ($p(A_{uv})$) is calculated based on the node (v) receiving information among the two nodes (u, v).

In principle, the WC model is applied to an underlying network graph (G) where all nodes and edges of the network has been checked. However, in the present embodiment, the diffusion probability calculation unit 230 should calculate the diffusion probability ($\Pr(A_{uv}|E_{uv})$) based on the inaccurate edge pruning graph $$\left(G_{gen-prun}^{(t)}\right)$$

rather than the underlying network graph (G).

First, looking at the case of applying the WC model to the underlying network graph (G), the diffusion probability ($\Pr(A_{uv}|E_{uv})$) of each node (v) may be calculated as $1/d_v$ according to the order ($d_v$) of the node (v) that receives information through edges. It can be seen that this is because, in the underlying network graph (G), each edge is an edge that has already been ascertained, and the edge probability ($\theta_{(t)}$) is 1.

On the other hand, since for the diffusion probability calculation unit 230 of the present embodiment, virtual edges together with ascertained edges are included in the edge pruning graph $$\left(G_{gen-prun}^{(t)}\right),$$

the diffusion probability ($\Pr(A_{uv}|E_{uv})$) can be calculated based on the predicted order $$\left(\hat{d}_v^{(t)}\right)$$

in which the edge probability ($\theta^{(t)}$) is reflected in the order ($d_v$) of each node. In this case, since the ascertained edges and the virtual edges change according to the number of queries (t), the predicted order $$\left(\hat{d}_v^{(t)}\right)$$

of the node in which the edge probability ($\theta^{(t)}$) according to the number of queries (t) is reflected is calculated as $$\left(\hat{d}_v^{(t)}\right) := \sum_{u \in N_v} \theta_{uv}^{(t)}$$

(where u is the neighbor node ($N_v$) of v). Accordingly, the weighted edge probability ($\Pr(E_{uv}A_{uv})$) can be calculated as $$\frac{1}{\hat{d}_v^{(t)}} \theta_{uv}^{(t)}.$$

In (d) to which the WC model is applied, information may be transmitted from the second and fourth nodes ($v_2$, $v_4$) to the first node ($v_1$). Therefore, the sum (1+0.6=1.6) of 1, which is the edge probability ($\theta_{21}^{(t)}$) of the edge ($E_{21}$) between the first and second nodes ($v_1$, $v_2$) in the direction of the first node ($v_1$), and 0.6, which is the edge probability ($\theta_{41}^{(t)}$) of for the edge ($E_{41}$) between the first and fourth nodes ($v_1$, $v_4$) is calculated as the predicted order $$\left(\hat{d}_1^{(t)}\right)$$

of the first node ($v_1$), and thus the diffusion probability ($\Pr(A_{21}|E_{21})$) of the two edges ($E_{21}$, $E_{41}$) that propagate information to the first node ($v_1$) may be equally calculated as 1/1.6.

Accordingly, the weighted edge probability ($\Pr(E_{21}A_{21})$) of the edge ($E_{21}$) can be calculated as 1/1.6 according to the edge probability ($\theta_{21}^{(t)}$), and the weighted edge probability ($Pr(E_{41}A_{41})$) for the edge ($E_{41}$) can be calculated as 0.6/1.6 according to the edge probability ($\theta_{41}^{(t)}$). The weighted edge probability ($Pr(E_{uv}A_{uv})$) for the remaining edges can also be calculated as shown in (d) in the same way.

The diffusion probability calculation unit 230 is configured to more accurately check the diffusion power of each of a plurality of nodes, and may be omitted in some cases.

The query node selection unit 240 receives a weighted edge graph ($G_w^{(t)}$) in which a weighted edge probability is applied to each edge, and selects a query node to request a query to check the neighbor node ($N_v$) connected with an edge based on the weighted edge probability of each edge. However, when the diffusion probability calculation unit 230 is omitted, it is also possible to receive an edge pruning graph $$\left(G_{gen-prun}^{(t)}\right)$$

and select a query node based on the edge probability ($\theta^{(t)}$) for each edge.

The query node selection unit 240 first determines whether the number of queries (t) to date is less than or equal to the limited number (T) (t≤T), and if it is determined that the number of queries (t) exceeds the limited number of times (T) (t>T), transmits the final subgraph ($G_T$) obtained before and last by the subgraph expansion unit 250 to the seed selection unit 300. That is, since all queries have already been used as much as the limited number of queries (T), the obtained subgraph ($G_T$) cannot be further expanded. Therefore, without selecting a query node, the final subgraph ($G_T$) in which nodes and edges have been checked so far is transmitted to the seed selection unit 300.

However, if the number of queries (t) up to now is less than or equal to the limited number of times (T) (t≤T), it selects a query node according to a predetermined method.

At this time, it is preferable that the query node selection unit 240 selects a node (u) that allows the subgraph ($G_{t+1}$) to be expanded as quickly as possible, as the query node. Thinking very simply, among the nodes (u∈$V_t$, u∈$Q_t$) included in the node set ($V_t$) of the current subgraph ($G_t$) but not included in the query node set ($Q_t$), a node with the most connected edges, that is, a node with the largest predicted order ($d_u^{(t)}$) can be selected. However, the expansion of the subgraph ($G_{t+1}$) should be considered by excluding edges that have already been ascertained through previous queries. Therefore, it is preferable to select a node, to which edges can be connected to the maximum, not included in the current subgraph ($G_t$). Accordingly, based on the weighted edge graph ($G_w^{(t)}$) obtained from the current number of queries (t), it may determine a node (u) at which the residual $$\left(r_u^{(t)} = \hat{d}_u^{(t)} - d_u^{(t)}\right)$$

obtained by subtracting the order $$\left(d_u^{(t)}\right)$$

checked by a query from the predicted order $$\left(\hat{d}_u^{(t)}\right)$$

of each node (u) is calculated as the maximum, and select it as a query node.

However, selecting the node with the largest residual ($r_u^{(t)}$) as a query node does not always yield the best results.

Figure 7:
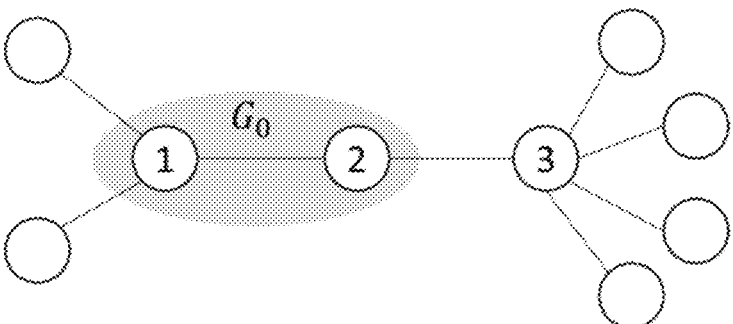
FIG. 7 is a diagram for explaining the expansion of a subgraph according to the selection of a query node.

FIG. 7 is a diagram for explaining the expansion of a subgraph according to the selection of a query node.

Referring to FIG. 7, in the initial subgraph ($G_0$), only first and second nodes ($v_1$, $v_2$) and one edge connecting the first and second nodes ($v_1$, $v_2$) are included. And when selecting a query node to expand to the next subgraph ($G_1$), if intending to select a node with a large residual ($r_u^{(1)}$) as a query node, since the first node ($v_1$) has two unascertained edges, the residual ($r_1^{(1)}$) is 2, whereas the second node ($v_2$) has a residual ($r_2^{(1)}$) of 1, so the first node ($v_1$) should be selected as the query node. In addition, if considering only one query request (t=1), this query selection can be seen as a suitable choice because the subgraph ($G_1$) is expanded larger. However, assuming that the query request is performed up to two times (t=2), if the first node ($v_1$) is selected as a query node at the time of the previous query request (t=1), since there are no additionally connected nodes with the two nodes expanded from the first node ($v_1$), the subgraph ($G_2$) is not expanded. On the other hand, if the second node ($v_2$) is selected as a query node at the time of the previous query request (t=1), since the residual ($r_3^{(2)}$) of the third node ($v_3$) expanded from the second node ($v_2$) is 4, four nodes are additionally connected, so that the subgraph ($G_2$) can be greatly expanded. Therefore, it can be seen that, in actuality, when the second node ($v_2$) rather than the first node ($v_1$) is selected as a query node at the time of the previous query request (t=1), the subsequent subgraph ($G_2$) can be further expanded.

Accordingly, among nodes of the current subgraph ($G_t$), a node having the shortest number of paths to a node, predicted to have the greatest potential influence in the network, that is, having the largest predicted order $$\left(\hat{d}_u^{(t)}\right),$$

may have to be selected as a query node.

Here, the third node ($v_3$) cannot be currently selected as a query node because there is no edge directly connected to a node of the current subgraph ($G_t$), however since it has the greatest influence in terms of influence, it can be said that it is a potential influence node which is desirable to be selected as a query node later. However, although the potential influence node (v) has the greatest influence, if the minimum number of paths ($GD^{(t)}(u, v)$) to the node (u) of the current subgraph ($G_t$) is large, queries corresponding to the minimum number of paths are inefficiently used.

Therefore, in the present embodiment, in order to efficiently expand the subgraph ($G_{t+1}$), a node (u) in the subgraph ($G_t$), having a large residual ($r_u^{(t)}$) in the weighted edge graph ($G_w^{(t)}$), and having a small minimum number of paths ($GD^{(t)}(u, v)$) to the node with the greatest potential influence, is selected as a query node.

The query node selection unit 240 first applies an influence maximization (IM) algorithm that detects k nodes that can maximize influence in a network where all nodes and edges have been previously ascertained, that is, the topological structure has been ascertained, to the weighted edge graph ($G_w^{(t)}$), thereby extracting k potential influence nodes (v). Since the IM algorithm is a known technique, it is not described in detail here.

However, k potential influence nodes must not have been selected as previous query nodes. Therefore, the query node selection unit 240 obtains a potential influence node set ($\hat{S}^{(t)}$) with the remaining potential influence nodes (v), except for the potential influence nodes included in the query node set ($Q_t$) among k potential influence nodes.

When the potential influence node set ($\hat{S}^{(t)}$) is obtained, the query node selection unit 240 calculates a rank (rank$^{(t)}$(u)) for query candidate nodes (u∈ $V_t$, u∈ Qt) included in the node set ($V_t$) of the current subgraph ($G_t$), but not included in the query node set ($Q_t$), according to Equation 4.

$$\text{rank}^{(t)}(u) = r_u^{(t)} - \alpha \sum_{v \in \hat{S}^{(t)}} GD^{(t)}(u, v) \qquad \text{[Equation 4]}$$

wherein, α is a hyperparameter for balance control.

According to Equation 4, the query node selection unit 240 calculates a rank (rank$^{(t)}$(u)) of each query candidate node (u) considering the residual ($r_u^{(t)}$) and the minimum number of paths ($GD^{(t)}$(u, v)) to the potential influence node (v). Specifically, the query node selection unit 240 is configured to increase the rank of the query candidate node (u) having a large residual ($r_u^{(t)}$) and a small minimum number of paths ($GD^{(t)}$(u, v)).

Then, it selects a query candidate node having the largest calculated rank (rank$^{(t)}$(u)) as a query node for the next query, and transmits it to the subgraph expansion unit 250.

The subgraph expansion unit 250 adds nodes and edges ascertained using a query to the current subgraph ($G_t$), thereby obtaining the next expanded subgraph ($G_{t+1}$) and transmitting it to the virtual edge generation unit 210.

The subgraph expansion unit 250 transmits a query for the query node selected by the query node selection unit 240 to a network server (not shown), and obtains information on edges ($E(N_G(v_t), v_t)$) connected to the query node, and neighbor nodes ($N_G(v_t)$) connected to the query node through the edges ($E(N_G(v_t), v_t)$). And by expanding the current subgraph ($G_t$) by combining ($V_t \cup N_G(v_t)$, $E_t \cup E(N_G(v_t), v_t)$)) with neighboring nodes ($N_G(v_t)$) and edges ($E(N_G(v_t), v_t)$) ascertained through a query in the current subgraph ($G_{t+1} = (V_t, E_t)$), it creates a new expanded subgraph ($G_{t+1} = (V_{t+1}, E_{t+1}) = (V_t \cup N_G(v_t), E_t \cup E(N_G(v_t), v_t))$). That is, the subgraph expansion unit 250 adds edges and neighboring nodes connected to the selected query node to the already obtained current subgraph ($G_t$), thereby obtaining an expanded subgraph ($G_{t+1}$).

This can be seen as that the subgraph expansion unit 250 obtains an enlarged partial network by extending the previously ascertained partial network in the underlying network graph (G) based on the query node.

In FIG. 3, it was assumed that the initial subgraph ($G_0$) is provided by the initial graph acquisition unit 110. Accordingly, comparing (b) and (d) of FIG. 3, it can be seen that, in the initial subgraph ($G_0$) of (b), only two nodes ($v_1$, $v_2$) and one edge are included, but in (d), as the the subgraph expansion unit 250 adds the third and fifth nodes ($v_3$, $v_5$) that are neighboring nodes of the second node ($v_2$) selected as a query node and connects them with edges, in the expanded subgraph ($G_1$), four nodes ($v_1$, $v_2$, $v_3$, $v_5$) and three edges are included.

Here, although not shown, the network node selection apparatus according to the present embodiment may further include a communication unit (not shown) for transmitting a query for the selected query node to the network server, and for receiving neighbor node and edge information corresponding to the transmitted query.

Meanwhile, the seed selection unit 300 transmits a query a limited number of times (T), receives the expanded final subgraph ($G_T$), and select k seed nodes. In this case, the seed selection unit 300 detects k seed nodes capable of maximizing influence by applying the above-described IM algorithm to the final subgraph ($G_T$). Although the final subgraph ($G_T$) is not obtained identically to the underlying network graph (G), it contains node and edge information that is maximally expanded in the range that can be obtained by using all of the queries in the available number of times. Therefore, since it can be said that it is network information of the maximum size that can be obtained in reality, the seed selection unit 300 detects k seed nodes capable of maximizing influence by applying the IM algorithm to the final weighted edge graph ($G_w^{(T)}$).

As a result, the network node selection apparatus according to the present embodiment expands the subgraph to the maximum possible size within the limited number of queries (T), and detects k predetermined seed nodes based on the finally expanded subgraph ($G_T$), thereby making it possible to accurately detect the most efficient seed node under constraints such as cost.

Figure 8:
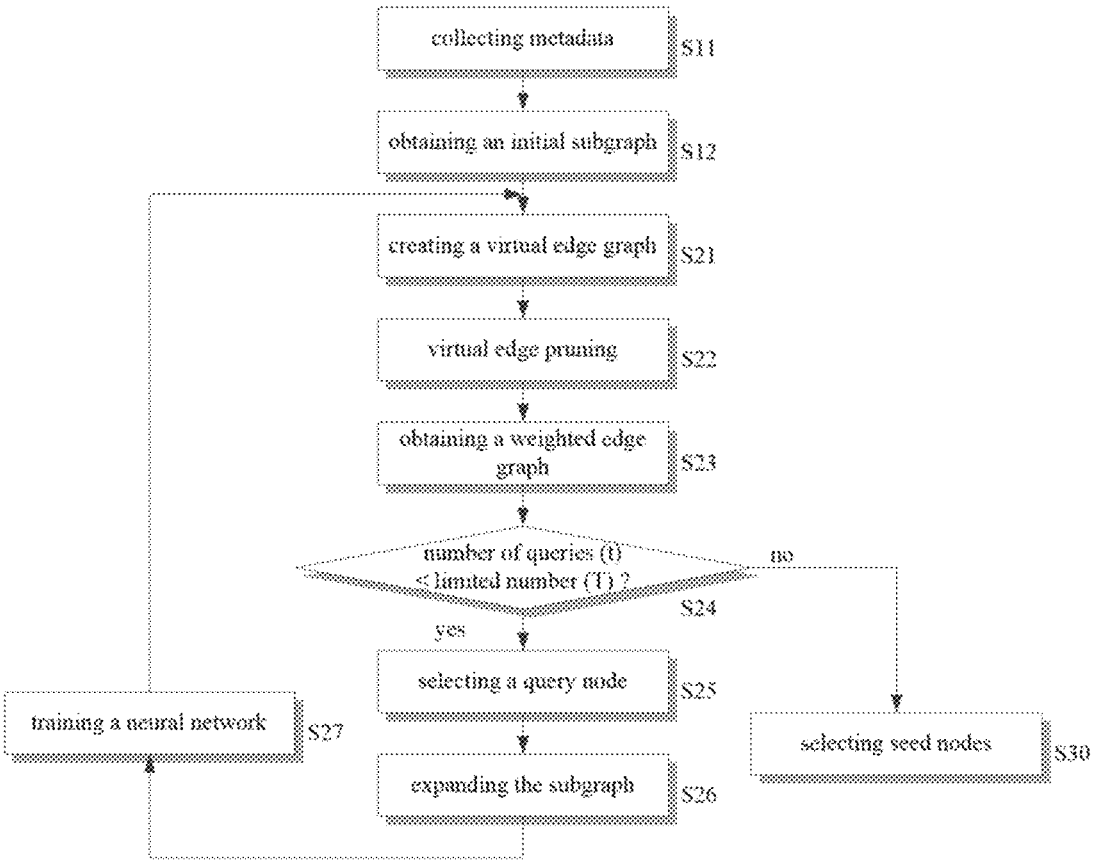
FIG. 8 shows a network node selection method according to an embodiment of the present disclosure.

FIG. 8 shows a network node selection method according to an embodiment of the present disclosure.

Referring to FIGS. 2 to 7, the network node selection method of FIG. 8 will be described. First, metadata for each of a plurality of nodes in the network is collected (S11).

Then, an initial subgraph ($G_0$) including at least one edge connecting between a plurality of nodes basically provided in the network is obtained (S12). At this time, if the network does not provide the initial subgraph ($G_0$), the step (S12) of obtaining the initial subgraph ($G_0$) may be omitted.

The step (S11) of collecting metadata and the step (S12) of obtaining the initial subgraph ($G_0$) are included in the initial data obtaining step.

When the initial data is obtained, virtual edges are connected between nodes whose edges are not ascertained by query based on the initial subgraph ($G_0$) and metadata of nodes obtained as the initial data, and using a pre-trained artificial neural network, the edge probability ($\theta^{(t)}$) indicating the possibility of the existence of each virtual edge according to the correlation of the metadata of the nodes is estimated and weighted with the weight of the virtual edge, so that a virtual edge graph $$\left( G_{gen}^{(t)} \right)$$

is created (S21).

Then, an edge pruning graph $$\left( G_{gen-prun}^{(t)} \right)$$

is obtained by removing virtual edges with low reliability in which the edge probability ($\theta^{(t)}$) weighted to each virtual edge of the virtual edge graph $$\left( G_{gen}^{(t)} \right)$$

19
20 is less than a predetermined reference probability (S22).

When the edge pruning graph $$\left(G^{(t)}_{gen-prun}\right)$$

is obtained, a weighted edge graph ($G_w^{(t)}$) is obtained by additionally weighting it with a diffusion weight according to the information diffusion capability of the node connected to each edge of the edge pruning graph $$\left(G^{(t)}_{gen-prun}\right)$$

(S23). In this case, the diffusion weight may be calculated using an IC model or a WC model, etc.

When the weighted edge graph ($G_w^{(t)}$) is obtained, it is determined whether the number of queries (t), which is the number of times the query has been transmitted to the network server so far, is less than or equal to a predetermined limited number (T) (t≤T) (S24).

If the number of queries (t) is less than or equal to the limited number (T), a query node that is easy to expand the size of the subgraph ($G_t$) through a query is selected, from among the nodes of the current subgraph ($G_t$) but not previously selected as a query node (S25). At this time, selected as a query node may be a node with a large residual $$\left(r_u^{(t)} = \hat{d}_u^{(t)} - d_u^{(t)}\right)$$

obtained by subtracting the order ($d_u^{(t)}$) which is the number of edges ascertained by query, from the predicted order $$(\hat{d}_u^t)$$

of the node in which the weighted edge probability of each edge is reflected in the number of edges connected to each node in the weighted edge graph ($G_w^{(t)}$), and with a small minimum number of paths ($GD^{(t)}(u, v)$) to the node with the greatest influence detected by the IM algorithm or the like among nodes not included in the subgraph ($G_t$) in the weighted edge graph ($G_w^{(t)}$).

When a query node is selected, information on nodes connected to the query node with edges is obtained by transmitting a query for the selected query node to the network server, the obtained edges and nodes are combined to the current subgraph ($G_t$) to expand the current subgraph ($G_t$), and accordingly a next subgraph ($G_{t+1}$) is obtained (S26).

Here, from the step (S21) of creating a virtual edge graph $$\left(G^{(t)}_{gen}\right)$$

to the step (S26) of expanding the subgraph ($G_t$), it can be referred to as a network expansion step.

In addition, in the network expansion step, added is a step (S27) of training an artificial neural network estimating the edge probability ($\theta^{(t)}$) with the metadata of the nodes of the obtained subgraph ($G_{t+1}$) and the edges between the nodes.

However, when the artificial neural network is trained in advance, the step of training the artificial neural network may be omitted.

However, if it is determined that the current number of queries (t) exceeds the limited number (T) (t>T), the predetermined k nodes are detected and selected as seed nodes in the order of greatest influence in the currently obtained weighted edge graph ($G_w^{(t)}$) (S30).

A method according to the present disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A network node selection apparatus for selecting a seed node capable of maximizing influence in a network without connection information, comprising:

memory; and a processor configured to execute tangible instructions stored in the memory, wherein the processor, when executed:

collects metadata representing all collectible data for each of a plurality of nodes included in the network;

obtains a final subgraph by repeating, for a predetermined limited number of times, a process of receiving a subgraph including metadata for the plurality of nodes and edges connecting between nodes previously ascertained through a query, creating virtual edges according to all connectable node combinations between nodes except for edges ascertained by the query and connecting nodes with the virtual edges, creating a virtual edge graph by weighting the corresponding virtual edge with an edge probability, which is the probability that an edge exists between nodes of the corresponding combination, obtained by computing the metadata of nodes according to each combination with an artificial neural network, selecting a query node to request a query to a network server from among the nodes of the subgraph based on the virtual edge graph and transmitting the query, and, when edge and node information connected to the selected query node are obtained in response to the transmitted query, combining the obtained edge and node information with the subgraph to obtain an expanded subgraph; and receives the final subgraph, analyzes an influence of each node in a predetermined way based on a connection relationship in which each of the nodes included in the final subgraph is connected to other nodes through edges, and selects a predetermined number of nodes with high influence as seed nodes, wherein the processor obtains the final subgraph by:

receiving a pre-obtained initial subgraph or a pre-obtained subgraph and metadata for each of the plurality of nodes from the network server, connecting virtual edges between a pair of nodes of all possible combinations in the remaining nodes except for edges connected to the nodes ascertained by the previous query, and generating the virtual edge graph by inferring the edge probability by neural network operation on the metadata and weighting a corresponding virtual edge;

obtaining an edge pruning graph by removing virtual edges whose edge probability is less than a predetermined reference probability from the virtual edge graph;

calculating a diffusion probability, which represents a probability that each node will propagate information to other nodes, based on the edge probabilities of edges and virtual edges connected to a plurality of nodes of the edge pruning graph, and obtaining a weighted edge graph by weighting the edges and virtual edges with the calculated diffusion probability as an additional weight;

selecting a query node for expanding a subgraph from among nodes not selected as a previous query node in a current subgraph based on the weighted edge graph when the number of query transmissions is less than or equal to the limited number; and transmitting a query to the network server according to the selected query node, receiving a response to the query, and expanding the current subgraph by combining edge and node information included in the received response to the current subgraph.

2. The network node selection apparatus according to claim 1, wherein generating the virtual edge graph includes:

receiving two metadata corresponding to each of a pair of nodes according to each combination, and obtaining two embedding vectors by performing a neural network operation on the two metadata using an artificial neural network, respectively;

calculating the edge probability by calculating the relationship between the two embedding vectors in a predetermined way; and connecting the virtual edge between each pair of nodes according to all combinations, and weighting it with the edge probability corresponding to each of the virtual edges as a weight in order to generate the virtual edge graph.

3. The network node selection apparatus according to claim 2, wherein obtaining two embedding vectors is performed using as a Siamese neural network including two artificial neural networks having the same structure and the same weight according to a pre-trained method.

4. The network node selection apparatus according to claim 2, wherein obtaining a final subgraph further includes training the artificial neural network by calculating a loss (L) according to the following Equation:

$$\mathcal{L}(W, x_u, \; x_v) = (1 - a_{uv})\frac{1}{2}(D_w(u, v))^2 + a_{uv}\frac{1}{2}\{\max(0, \, r - D_w(u, v))\}^2$$

22 based on a cosine similarity $(D_w(u,v))$ between two embedding vectors $(e_u, \; e_v)$ obtained from metadata about a pair of nodes $(u, \; v)$ of the subgraph whose connection through an edge is checked, and an edge weight $(a_{uv})$ according to the edge probability, and backpropagating the calculated loss.

5. The network node selection apparatus according to claim 2, wherein calculating the edge probability includes receiving the two embedding vectors, performing a Hadamard product with the two embedding vectors, and normalizinges with a sigmoid function, thereby obtaining the edge probability.

6. The network node selection apparatus according to claim 1, wherein obtaining a weighted edge graph includes weighting each edge with a diffusion probability using either an independent cascade (IC) model, which is a diffusion model that sets the same diffusion probability for all nodes to propagate information to other nodes connected by edges, or a weighted cascade (WC) model that sets the diffusion probability of each edge differently according to the number of edges connected to each node and the edge probability weighted to each edge connected.

7. The network node selection apparatus according to claim 1, wherein selecting a query node includes, when the number of query transmissions is less than or equal to the limited number, selecting the query node among query candidate nodes of the current subgraph that are not selected as the previous query node, considering a residual $$\left(r_u^{(t)} = \hat{d}_u^{(t)} - d_u^{(t)}\right)$$

obtained by subtracting the order $(d_u^{(t)})$, which is the number of edges ascertained by the query, from the predicted order $$(\hat{d}_u^{(t)})$$

of the node in which the weighted edge probability of each edge is reflected in the number of edges connected to each node in the weighted edge graph, and the minimum number of paths $(GD^{(t)}(u, \; v))$ to nodes with large influence detected according to the pre-designated influence maximization algorithm among nodes not included in the subgraph in the weighted edge graph.

8. The network node selection apparatus according to claim 7, wherein selecting the query node includes detecting k nodes with large influence according to the influence maximization algorithm in the weighted edge graph obtained from the current number of queries (t), and obtainings a potential influence node set $(\hat{S}^{(t)})$ by excluding nodes selected as a previous query node among the detected k nodes, calculating a rank ($\mathrm{rank}^{(t)}(u)$) of the query candidate nodes (u) by the following Equation:

$$\mathrm{rank}^{(t)}(u) = r_u^{(t)} - \alpha \sum_{v \in \hat{S}^{(t)}} GD^{(t)}(u, v)$$

according to the residual ($r_u^{(t)}$) and the minimum number of paths ($GD^{(t)}(u, v)$) to nodes of the potential influence node set ($\hat{S}^{(t)}$); and selecting a query candidate node with the largest calculated rank ($\mathrm{rank}^{(t)}(u)$) as a query candidate.

9. The network node selection apparatus according to claim 7, wherein selecting the query node further includes determining the last expanded subgraph as the final subgraph, without selecting a query node when the number of query transmissions exceeds the limited number.

10. A network node selection method for selecting a seed node with the greatest influence in a network without connection information, performed by a computer-implemented node selection apparatus comprising a processor and memory configured to execute tangible instructions to improve network operation efficiency, the method comprising the steps of:

collecting metadata representing all collectible data for each of a plurality of nodes included in the network;

obtaining a final subgraph by repeating, for a predetermined limited number of times, a process of receiving a subgraph including metadata for the plurality of nodes and edges connecting between nodes previously ascertained through a query, creating virtual edges according to all node combinations that can be connected between nodes except for edges ascertained by query and connecting nodes with the virtual edges, creating a virtual edge graph by weighting the corresponding virtual edge with an edge probability, which is a probability that an edge exists between nodes of the corresponding combination, obtained by performing a neural network operation on the metadata of nodes according to each combination using an artificial neural network, selecting a query node to request a query to a network server from among nodes of the subgraph based on the virtual edge graph and transmitting the query, and, when edge and node information connected to the selected query node are obtained in response to the transmitted query, and combining the obtained edge and node information with the subgraph to obtain an expanded subgraph; and receiving the final subgraph, analyzing an influence of each node in a predetermined way based on a connection relationship in which each of the nodes included in the final subgraph is connected to other nodes through edges, and selecting a predetermined number of nodes with high influence as seed nodes, wherein the step of obtaining the final subgraph further includes the steps of:

receiving a pre-obtained initial subgraph or a pre-obtained subgraph and metadata for each of the plurality of nodes from the network server, connecting the virtual edge between a pair of nodes of all possible combinations in the remaining nodes except for edges connected to the nodes ascertained by the previous query, and generating the virtual edge graph by inferring the edge probability by neural network operation on the metadata and weighting a corresponding virtual edge;

obtaining an edge pruning graph by removing virtual edges whose edge probability is less than a predetermined reference probability from the virtual edge graph;

calculating a diffusion probability, which represents a probability that each node will propagate information to other nodes, based on the edge probabilities of edges and virtual edges connected to a plurality of nodes of the edge pruning graph, and obtaining a weighted edge graph by weighting the edges and virtual edges with the calculated diffusion probability as an additional weight;

when the number of query transmissions is less than or equal to the limited number, selecting a query node for expanding a subgraph from among nodes not selected as a previous query node in a current subgraph based on the weighted edge graph; and transmitting a query to the network server according to the selected query node, receiving a response to the query, and expanding the current subgraph by combining edge and node information included in the received response to the current subgraph.

11. The network node selection method according to claim 10, wherein the step of generating the virtual edge graph includes the steps of:

receiving two metadata corresponding to each of a pair of nodes according to each combination, and obtaining two embedding vectors by performing a neural network operation on the two metadata using an artificial neural network, respectively;

calculating the edge probability by calculating the relationship between the two embedding vectors in a predetermined way; and connecting the virtual edge between each pair of nodes according to all combinations, and weighting it with the edge probability corresponding to each of the virtual edges as a weight, in order to generate the virtual edge graph.

12. The network node selection method according to claim 11, wherein the step of obtaining two embedding vectors is performed using a Siamese neural network including two artificial neural networks having the same structure and the same weight according to a pre-trained method.

13. The network node selection method according to claim 11, wherein the step of obtaining a final subgraph further includes a step of training the artificial neural network by calculating a loss (L) according to the following Equation:

$$\mathcal{L}(W, x_u, x_v) = (1 - a_{uv})\frac{1}{2}(D_w(u, v))^2 + a_{uv}\frac{1}{2}\{\max(0, r - D_w(u, v))\}^2$$

based on a cosine similarity ($D_w(u,v)$) between two embedding vectors ($e_u$, $e_v$) obtained from metadata about a pair of nodes (u, v) of the subgraph whose connection through an edge is checked, and an edge weight ($a_{uv}$) according to the edge probability, and backpropagating the calculated loss.

14. The network node selection method according to claim 11, wherein the step of calculating the edge probability includes receiving the two embedding vectors, performing a Hadamard product with the two embedding vectors, and normalizing with a sigmoid function, thereby obtaining the edge probability.

15. The network node selection method according to claim 10, wherein the step of obtaining a weighted edge graph includes weighting each edge with a diffusion probability using either an independent cascade (IC) model, which is a diffusion model that sets the same diffusion probability for all nodes to propagate information to other nodes connected by edges, or a weighted cascade (WC) model that sets the diffusion probability of each edge differently according to the number of edges connected to each node and the edge probability weighted to each edge connected.

16. The network node selection method according to claim 10, wherein the step of selecting a query node includes, when the number of query transmissions is less than or equal to the limited number, selecting the query node among query candidate nodes of the current subgraph that are not selected as the previous query node, considering a residual $$\left(r_u^{(t)} = \hat{d}_u^{(t)} - d_u^{(t)}\right)$$

obtained by subtracting the order ($d_u^{(t)}$), which is the number of edges ascertained by the query, from the predicted order $$(\hat{d}_u^{(t)})$$

of the node in which the weighted edge probability of each edge is reflected in the number of edges connected to each node in the weighted edge graph, and the minimum number of paths ($GD^{(t)}$ (u, v)) to nodes with large influence detected according to the pre-designated influence maximization algorithm among nodes not included in the subgraph in the weighted edge graph.

17. The network node selection method according to claim 16, wherein the step of selecting a query node includes the steps of:

detecting k nodes with large influence according to the influence maximization algorithm in the weighted edge graph obtained from the current number of queries (t), and obtaining a potential influence node set ($\hat{S}^{(t)}$) by excluding nodes selected as a previous query node among the detected k nodes;

calculating a rank (rank$^{(t)}$(u)) of the query candidate nodes (u) by the following Equation:

$$\text{rank}^{(t)}(u) = r_u^{(t)} - \alpha \sum_{v \in \hat{S}^{(t)}} GD^{(t)}(u, v)$$

according to the residual ($r_u^{(t)}$ and the minimum number of paths ($GD^{(t)}$(u, v)) to nodes of the potential influence node set ($\hat{S}^{(t)}$); and selecting a query candidate node with the largest calculated rank (rank$^{(t)}$(u)) as a query candidate.

18. The network node selection method according to claim 16, wherein the step of selecting a query node further includes a step of determining the last expanded subgraph as the final subgraph, without selecting a query node when the number of query transmissions exceeds the limited number.

\* \* \* \* \*